United States Patent
Bloice

[11] 3,873,981
[45] Mar. 25, 1975

[54] MICROWAVE RADIATION MONITOR
[75] Inventor: John Anthony Bloice, Richmond, Surrey, England
[73] Assignee: Peak Technologies Limited, Isleworth, Middlesex, England
[22] Filed: Sept. 7, 1973
[21] Appl. No.: 395,164

[30] Foreign Application Priority Data
Sept. 20, 1972 United Kingdom............... 43542/72

[52] U.S. Cl............ 343/5 PD, 340/258 B, 340/409, 343/703
[51] Int. Cl......................... G01s 7/40, G08b 13/22
[58] Field of Search............ 340/258 A, 258 B, 409; 343/5 PD, 703

[56] References Cited
UNITED STATES PATENTS
3,471,845   10/1969   Sokoloff...................... 343/5 PD X Primary Examiner—T. H. Tubbesing
Attorney, Agent, or Firm—Phillips, Moore, Weissenberger, Lempio & Strabala

[57] ABSTRACT
A microwave radiation monitor comprises a microwave receiver antenna containing a microwave diode connected to a first monitor circuit for monitoring the microwave energy level within the aerial. The first monitor circuit responds to this level falling below a predetermined value by providing an alarm signal. A second monitor circuit responds to the presence in the output of the microwave diode of a frequency in a predetermined range of relatively low frequencies by providing the same alarm signal. The microwave energy level is monitored by modulating it at a relatively high frequency, the level of the de-modulated signal being representative of the energy level. Using the monitor in combination with a microwave radar unit provides a three-fold protection against failure. Failure of the radar unit itself in a fail-safe mode will result in the generation of an alarm, whether or not the failure is such as to cause the monitor to generate an alarm. Failure of the transmitter of the radar unit in a non-fail-safe mode, or masking or mis-direction of the radar unit will result in the generation of an alarm by the monitor. Failure of the receiver of the radar unit in a non-fail-safe mode will generate an alarm in the presence of an intruder, movements of the latter altering the radiation pattern in the antenna to produce the relatively low frequencies in the microwave diode output.

10 Claims, 3 Drawing Figures 3,873,981

MICROWAVE RADIATION MONITOR

The present invention relates to a microwave radiation monitor.

Various forms of intruder detector operating on the basis of field-disturbance sensors or Doppler systems are now available.

It is extremely difficult to design such instruments so that any component failure will result in a fail-safe condition, generally by generating an alarm. One proposal to overcome this difficulty is to provide a self-checking arrangement in the unit. In such an arrangement a signal is generated within the unit at regular intervals which, if the unit is operating satisfactorily, would generate an alarm, if the alarm circuitry were not at the same time inhibited.

Another method of safeguarding the installation is to install a microwave monitor. This consists of a microwave receiver positioned to receive the radiation transmitted from the microwave radar unit, at or near the edge of the area under surveillance. The monitor is wired in to the alarm system so that should it no longer receive the radiation transmitted from the radar unit an alarm is given.

As well as protecting against failure of the transmitter circuitry of the radar unit, such a monitor provides other safeguards.

For example, the radar unit may be re-positioned during the day so as to no longer cover the area to be protected. This may happen accidentally, or a would be burglar may deliberately re-position the unit. A would be burglar may also attempt to cover the alarm with aluminum foil or some form of microwave absorbent material.

The radar unit may also be accidentally obscured during the day time by packing cases or the like being placed in front of it. The provision of a microwave monitor as just described guards against such eventualities.

The provision of such a monitor is not entirely foolproof, however. It will certainly detect the various situations described above, including transmitter failure in the radar unit, but will not be able to detect a failure in the receiver section of the radar unit. Such a failure might not be a fail-safe one, so that the alarm system would be rendered entirely inoperative without giving any indication of this fact.

The present invention is intended to provide an improved form of microwave monitor for use with a microwave radar unit, with which this disadvantage is eliminated.

In accordance with the invention there is provided a microwave radiation monitor comprising a microwave receiver antenna containing a microwave diode connected to a first monitor circuit for monitoring the microwave energy level within the antenna and adapted to respond to the level falling below a predetermined value by providing an alarm signal, and a second monitor circuit responding to the presence in the output of the microwave diode of a frequency in a predetermined range of relatively low frequencies by providing the alarm signal.

The monitor may include means for modulating the microwave energy entering the antenna at a predetermined and fixed relatively high frequency, the output signal of the microwave diode being de-modulated to provide a signal at the modulation frequency, the amplitude of which is indicative of the energy level within the antenna.

The invention also includes a microwave intruder detector system comprising a microwave radar unit arranged to provide cover of an area under surveillance and a microwave monitor as defined in the preceding two paragraphs arranged at the edge of the field of surveillance to receive microwave energy transmitted from the radar unit, the outputs of the unit and monitor being so interconnected that an alarm is generated in response to the appearance of the monitor alarm signal, independently of the operation of the radar unit.

Using this monitor in combination with the radar unit provides a three-fold protection against failure.

Failure in the radar unit itself in a fail-safe condition will result in the generation of an alarm, whether or not the failure is such as to cause the monitor to generate the alarm.

Failure of the transmitter of the radar unit in a non-fail-safe mode, or masking or mis-direction of the radar unit will result in the generation of an alarm by the monitor.

Failure of the receiver of the radar unit in a non-fail-safe mode will generate an alarm in the presence of an intruder. This is because movements in the field of surveillance alter the radiation pattern in the field and therefore the wave pattern within the antenna of the microwave monitor. These movements produce the relatively low frequency signals in the microwave diode which are detected to generate an alarm.

The invention will now be described in more detail, by way of example only, and with reference to the accompanying diagrammatic drawings in which.

Figure 1:
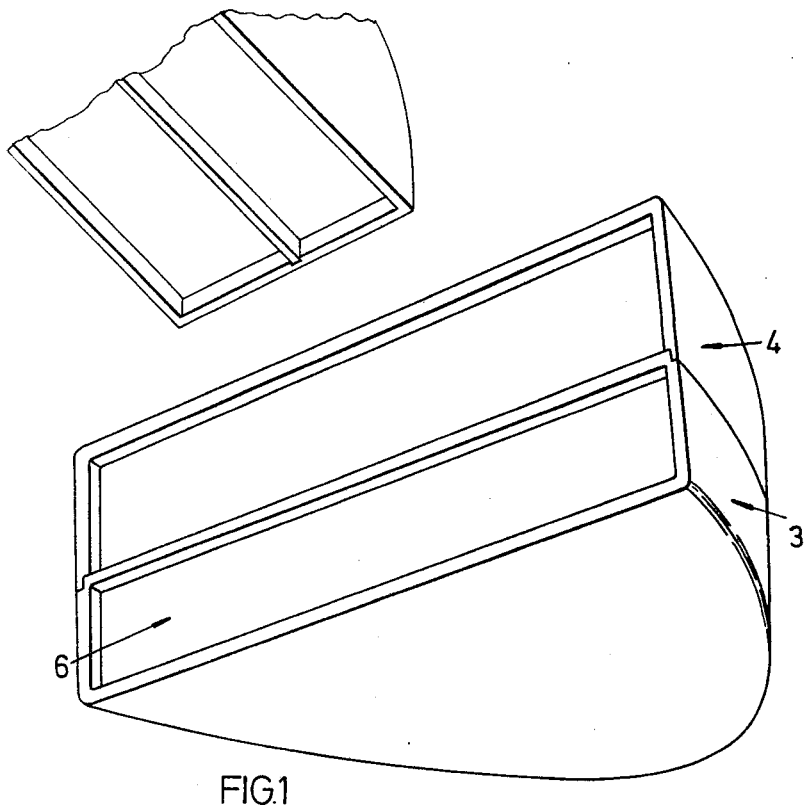
FIG. 1 is a perspective view of a microwave monitor casing together with a fragmentary perspective view of a radar unit.
Figure 2:
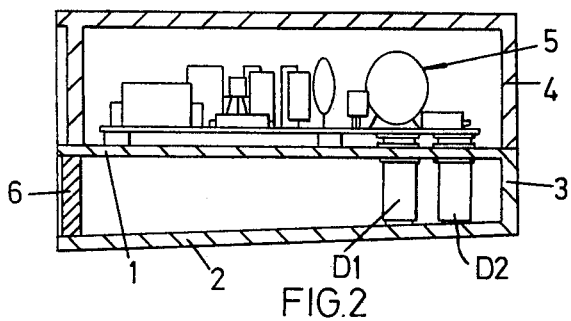
FIG. 2 is a cross-section through the casing showing the mounting of two microwave diodes in the antenna of the monitor.

Referring to FIGS. 1 and 2, the monitor antenna is a half-cheese antenna bounded by a pair of slightly divergent plane walls 1 and 2 and a wall 3 of generally parabolic form. Mounted on top of and fastened to the antenna is a casing 4 having generally the same parabolic form. Within the casing 4 are mounted the electronic components 5 of the monitor, microwave diodes D1 and D2 being mounted in the antenna and being connected to the electronic circuitry through the upper antenna wall 1. The antenna aperture is closed by a panel 6 of non-absorbent material.

The monitor may be mounted in a number of ways, the most versatile being by means of a universal ball-joint connecting the antenna to a wall-mounting plate (not shown).

Figure 3:
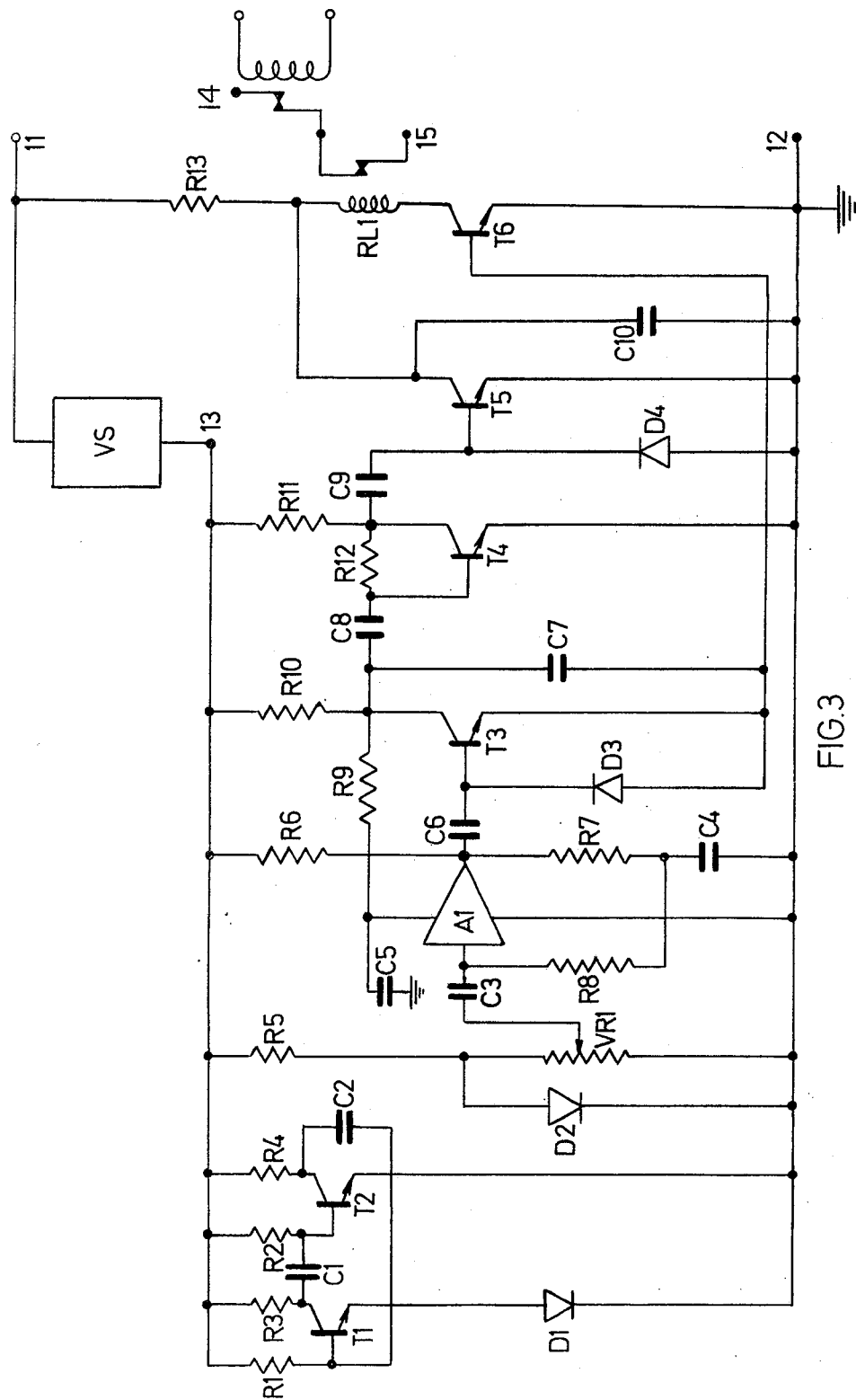
FIG. 3 is a circuit diagram of the monitor.

Referring to FIG. 3, the microwave diodes D1 and D2 are respectively connected to a multivibrator and monitor circuitry.

The monitor circuitry is connected to the positive and negative terminals 11 and 12 respectively of a direct current supply of approximately 12 volts. To the terminal 11 is connected the positive pole of an integrated circuit voltage stabilizer VS providing at an output terminal 13 a stabilized unidirectional voltage of 6 volts.

The multivibrator comprises NPN transistors T1 and T2 the bases of which are connected to terminal 13 through respective resistances R1 and R2. The collectors of these transistors are connected to the terminal 13 through respective resistances R3 and R4. The collector of transistor T1 is connected to the base of transistor T2 through a capacitance C1, while the collector of transistor T2 is connected to the base of transistor T1 through a capacitance C2. The emitter of transistor T1 is connected to the anode of the microwave diode D1 whose cathode is connected to ground. The emitter of transistor T2 is connected directly to ground.

The anode of the second microwave diode D2 is connected to terminal 13 through a resistance R5, while its cathode is connected to ground.

The cathodes of diodes D1 and D2 and the emitter of transistor T2 are suitably connected to the antenna ground.

The anode of diode D2 is also connected to ground through a variable resistance VR1. The cursor of resistance VR1 is connected through a capacitance C3 to the input of an integrated circuit amplifier A1. The output of amplifier A1 is connected to the terminal 13 through a resistance R6, and is also connected to ground through a resistance R7 in series with a capacitance C4. The junction of capacitance C4 with resistance R7 is connected to the amplifier input through a resistance R8.

The negative power supply terminal of amplifier A1 is connected to earth while the positive power supply terminal is connected to terminal 13 through resistances R9 and R10. It is also grounded through a capacitance C5.

The output of amplifier A1 is connected through a capacitance C6 to the base of a third NPN transistor T3. The emitter of transistor T3 is connected to the base of a sixth PNP transistor T6, and a diode D3 has its anode connected to the emitter of transistor T3 and its cathode connected to the base of transistor T3. The collector of transistor T3 is connected to the junction of resistances R9 and R10. The collector of transistor T3 is connected to its emitter through a capacitance C7 and through a capacitance C8 to the base of a fourth NPN transistor T4 whose emitter is connected to ground.

The collector of transistor T4 is connected to terminal 13 through a resistance R11 and to the base of transistor T4 through a resistance R12. The collector of transistor T4 is further connected through a capacitance C9 to the base of a fifth NPN transistor T5. The base of transistor T5 is connected to the cathode of a diode D4 whose anode is connected to ground. The emitter of this transistor is connected directly to ground while its collector is connected to ground through a capacitance C10. The collector is also connected to terminal 11 through a resistance R13.

Transistor T6 has its emitter connected directly to ground and its collector connected to terminal 11 through the energisation coil of a relay RL1 and the resistance R13. The relay RL1 has a pair of normally-open contacts connected in series with the normally-closed contacts of the alarm relay of the radar unit between terminals 14 and 15.

The monitor operates as follows:

The monitor detects the microwave energy transmitted by a radar unit, as already mentioned. To detect the transmitter signal at low levels it is common practice to modulate the received signal entering the antenna of the detector. This may be done in a number of ways, including the use of a mechanical chopper.

In the present system the signal received by the monitor is modulated by means of the microwave diode D1.

The circuitry including transistors T1 and T2 is a conventional multivibrator whose circuit values are chosen to provide a running rate of approximately 1 kHz. The emitter of transistor T1 is connected to ground via the microwave diode D1. This diode is so positioned in the antenna, as seen from FIG. 2, that any microwave energy entering the antenna will be modulated by the changing microwave impedance of the diode D1. The microwave energy entering the antenna is thus modulated at 1 kHz. The second microwave diode D2 therefore receives a modulated signal when microwave energy enters the antenna. As a result of this modulation of the incoming signal, alternating current amplification circuitry may be employed in the monitoring circuitry, so avoiding the difficulties associated with high gain direct current amplifiers, including temperature-drift, direct current offset and so on.

The microwave diode D2 is forward biased for optimum sensitivity by means of the potential divider comprising resistance R5 and the variable resistance VR1. The required amount of the 1 kHz signal is fed to the amplifier A1 through the blocking capacitor C3. The working point of the amplifier A1 is stabilized in a conventional manner by conventional feedback from output to input.

The amplified 1 kHz signal at the amplifier output is detected in the circuit comprising diode D3, transistor T3 and smoothing capacitance C7. This circuit forms a direct current amplifier as well as a detector circuit, and if the 1 kHz signal is present at the amplifier output the transistor T3 will conduct. The return circuit to ground for this detector/amplifier circuit is via transistor T6, so that the latter will conduct and hold the relay RL1 energised.

The collector load of transistor T3 also acts as a feed to the earlier amplification stages of the amplifier A1. An increase in the signal strength will thus cause an increase in the current flowing through transistor T3 so that its collector voltage will fall. This reduces the supply to the early stages of amplification in amplifier A1 to reduce the gain, so that an automatic gain control is achieved.

The relay RL1 is thus held energised by the rectified 1 kHz signal, the frequency of which is well above any Doppler frequency signals generated by moving targets in the protected area.

An intruder moving in the protected area will cause changes in the standing wave pattern within the monitor antenna, as already mentioned, which will result in low frequency components in the output of the microwave diode D2. The collector voltage of transistor T3 will follow any such low frequency fluctuations, which will be amplified by the transistor T4.

The circuit comprising diode D4, transistor T5 and capacitance C10 forms a second detector/amplifier circuit, connected to receive the relatively low frequency signals from transistor T4. These cause transistor T5 to conduct, the result of which is a reduction in the voltage available for the collector supply of the relay drive transistor T6, so that the relay RL1 is deenergised, even if adequate base drive is presented to transistor T6.

The amplifier circuitry for the relatively low frequency signals is made insensitive to signals at 1 kHz, its response being optimised for a band of frequencies commonly produced by moving targets, namely some 1 to 100 Hz.

While the output from the 1 kHz amplification circuitry is employed to energise the relay RL1, the output from the low frequency amplification circuitry causes the relay to deenergise, even in the presence of an output from the high frequency amplification circuitry.

Deliberate or accidental failure of the microwave alarm transmitter will be detected by the absence of the 1 kHz signal. Obstruction or mis-alignment of the radar unit is similarly detected.

If the low-frequency circuitry were not provided, some degree of protection would still be obtained in that if an intruder passed between the radar unit and the monitor his presence would be detected, in much the same way as in a light beam detector system. A person who knew that the alarm was inoperative, for example a would be burglar who had during the day time reduced the range of the radar unit by tampering with the control panel, would be easily able to avoid passing directly between the radar unit and the monitor.

The entrance of such a person into the protected area would still be detected, however, by virtue of the provision of the low-frequency circuitry. The corresponding low-frequency signal in the monitor would cause an alarm to be sounded, in much the same way as it would if the radar unit were properly operative.

The microwave monitor just described has a parabolic half-cheese antenna optimised for frequencies in the X-band. Many alternative antenna systems may be employed, however, working over any desired range of ultra high or microwave frequencies.

The relay contacts of the monitor are closed so long as radiation from the radar unit is detected, and are suitably wired in series with the alarm relay so that accidental or deliberate obstruction or cutting off of the transmitted field would make it impossible to set the alarm circuit, where it is inoperative during the day time for example, or would cause the alarm to sound. Alternatively the monitor may be wired into a separate alarm circuit.

The monitor can be used to increase the security of a microwave alarm installation, and as described has a current consumption of only some 15 mA from a 10 to 14 volt supply.

I claim:

1. A microwave radiation monitor, comprising: a microwave receiver antenna; a microwave diode contained in said antenna; a first monitor circuit for monitoring the microwave energy level within said antenna, connected to said microwave diode and adapted to respond to said level falling below a predetermined value by providing an alarm signal; and a second monitor circuit connected to said microwave diode and responding to the presence in the output thereof of a frequency in a predetermined range of relatively low frequencies by providing said alarm signal.

2. A monitor as set forth in claim 1, further including: means for modulating the microwave energy entering said antenna at a predetermined and fixed relatively high frequency; and circuit for demodulating the output signal of said microwave diode to provide a signal at the modulation frequency the amplitude of which is indicative of said energy level within said antenna.

3. A monitor as set forth in claim 2, in which said modulation means includes a further microwave diode in said antenna, and an oscillator which operates at said relatively high frequency coupled to the output of said further microwave diode.

4. A monitor as set forth in claim 3, in which said oscillator is a multivibrator.

5. A monitor as set forth in claim 2, in which said relatively high frequency is substantially equal to 1 kHz.

6. A monitor as set forth in claim 1, in which said first monitor circuit includes: an amplifier connected to receive the output of said first-mentioned microwave diode; a first diode rectifier connected to the output of said amplifier to de-modulate the output signal thereof; a first transistor connected to receive and amplify the de-modulated signal; a relay which is energisable to inhibit the giving of an alarm; and a second transistor connected to said first transistor so as to conduct when the output signal of said first transistor exceeds a predetermined level to energise said relay to inhibit the giving of an alarm.

7. A monitor as set forth in claim 6, in which the output signal of said first transistor is applied to said amplifier to provide an automatic gain control.

8. A monitor as set forth in claim 6, in which said second monitor circuit includes: a low-pass filter connected to the output of said amplifier; a second diode rectifier connected to the output of said low-pass filter; and a third transistor connected to receive the signal de-modulated by said second diode rectifier and conducting when that signal exceeds a predetermined level to de-energise said alarm-inhibiting relay even if said second transistor is conductive.

9. A microwave intruder detector system, comprising: a microwave radar unit arranged to provide cover of an area under surveillance and a microwave monitor comprising: a microwave receiver antenna; a microwave diode contained in said antenna; a first monitor circuit for monitoring the microwave energy level within said antenna, connected to said microwave diode and adapted to respond to said level falling below a predetermined value by providing an alarm signal; and a second monitor circuit connected to said microwave diode and responding to the presence in the output thereof of a frequency in a predetermined range of relatively low frequencies by providing said alarm signal, said monitor being arranged in use at the edge of the field of surveillance to receive microwave energy transmitted thereto from said radar unit, the outputs of said unit and said monitor being so interconnected that an alarm is generated in response to the appearance of the monitor alarm signal, independently of the operation of said radar unit.

10. A system as set forth in claim 9, in which said radar unit includes a relay which is energised to generate said alarm, said microwave monitor includes a relay which is de-energised to generate said alarm, and the contacts of said alarm relay of said monitor are wired in series with the contacts of said alarm relay of said radar unit.

* * * * *